(12) United States Patent
Krishna (10) Patent No.: US 7,945,558 B2
(45) Date of Patent: May 17, 2011

(54) QUERY OPTIMIZER WITH JOIN CARDINALITY ESTIMATION WHICH MITIGATES THE EFFECTS OF SKEW

(75) Inventor: Murali Mallela Krishna, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 418 days.

(21) Appl. No.: 12/008,357

(22) Filed: Jan. 9, 2008

(65) Prior Publication Data

US 2009/0177623 A1  Jul. 9, 2009

(51) Int. Cl.
*G06F 7/00* (2006.01)
*G06F 17/30* (2006.01)

(52) U.S. Cl. .................................. 707/713; 707/718
(58) Field of Classification Search .................. None
See application file for complete search history.

(56) References Cited

U.S. PATENT DOCUMENTS

| | | | |
|---|---|---|---|
| 7,010,516 B2* | 3/2006 | Leslie ................................ 1/1 |
| 7,111,025 B2* | 9/2006 | Finlay et al. .................. 707/714 |
| 7,203,685 B2 | 4/2007 | Abdo et al. |
| 2004/0010488 A1* | 1/2004 | Chaudhuri et al. .............. 707/3 |
| 2004/0215626 A1* | 10/2004 | Colossi et al. ................ 707/100 |
| 2004/0260675 A1* | 12/2004 | Bruno et al. .................... 707/2 |
| 2005/0071331 A1* | 3/2005 | Gao et al. ........................ 707/4 |
| 2005/0131914 A1* | 6/2005 | Abdo et al. ................... 707/100 |
| 2005/0267866 A1* | 12/2005 | Markl et al. ..................... 707/2 |
| 2005/0267877 A1* | 12/2005 | Chaudhuri et al. .............. 707/3 |
| 2007/0061288 A1* | 3/2007 | Fuh et al. ......................... 707/2 |
| 2007/0124276 A1 | 5/2007 | Weissman et al. |
| 2007/0192283 A1 | 8/2007 | Larson et al. |
| 2007/0226176 A1 | 9/2007 | Bestgen et al. |
| 2008/0133454 A1* | 6/2008 | Markl et al. ..................... 707/2 |

OTHER PUBLICATIONS

Estan et al., "End-biased Samples for Join Cardinality Estimation", Apr. 2006, pp. 1-14.*
Cristian Estan, and Jeffrey F. Naughton, "End-Biased Samples for Join Cardinality Estimation", 22$^{nd}$ International Conference on Data Engineering (ICDE 2006), Apr. 2006, 14 sheets.
V. Markl, G.M. Lohman, and V. Raman, "LEO: An Autonomic Query Optimizer for DB2", IBM Systems Journal, vol. 42, No. 1, 2003, pp. 98-106.

* cited by examiner

*Primary Examiner* — Kuen S Lu
*Assistant Examiner* — Tuan Pham (57) ABSTRACT

One embodiment relates to a computer-implemented method to estimate a cardinality of a database query. Single table cardinalities are determined after application of selection predicates. In addition, pair-wise join selectivities are estimated without assuming independence between selection and join predicates. Said pair-wise join selectivities are multiplied with said single table cardinalities after application of the selection predicates. Another embodiment relates to a computer apparatus including a cardinality estimator. The cardinality estimator includes computer-readable instructions configured to (a) determine single table cardinalities after application of selection predicates from the database query, (b) estimate pair-wise join selectivities without assuming independence between the selection predicates and join predicates of the database query, and (c) multiply said pair-wise join selectivities with said single table cardinalities after application of the selection predicates. Other embodiments, aspects and features are also disclosed.

10 Claims, 8 Drawing Sheets

---

Estimate of Pair-wise Join Selectivity without Assumption of Independence between Selection and Join Predicates of the Same Table R' = resultant table *after the selection predicate has been applied to table R*.

From example, |R'| = 1

S' = resultant table *after the selection predicate has been applied to table S*.

From example, |S'| = |S|

Compute pair-wise join cardinality: JC' (R',S') = size (cardinality) of resultant table *after joining R' and S'*.

From example, JC' (R',S') = 0.75 * |S|

Estimate of pair-wise join selectivity: js' (R',S') = JC' (R',S') / (|R'|*|S'|)

From example, js'(R',S') = 0.75 * |S| / (1*|S|) = 0.75

(Conventional)

Example Incidence Graph:

Product of table cardinalities:

$$|R| * |N| * |C| * |O| * |S| * |L| \qquad (A)$$

Product of pair-wise join selectivities:

$$\frac{1}{|R|} * \frac{1}{|N|} * \frac{1}{|N|} * \frac{1}{|C|} * \frac{1}{|O|} * \frac{1}{|S|} \qquad (B)$$

Product of single table selectivities:

For example, assume single table selectivites are 1/5 for R and 1/7 for O, and 1 for N, C, S, and L.

$$\frac{1}{5} * 1 * 1 * \frac{1}{7} * 1 * 1 \qquad (C)$$

Estimated query (higher-order join) cardinality:

$$(A) * (B) * (C) = \frac{|L|}{|N|} * \frac{1}{35}$$

FIG. 3
(Conventional)

Example of Inaccurate Estimate of Pair-wise Join Selectivity due to Data Skew Incidence Graph: $R \longrightarrow S$ Select * from R,S where R.a = "US" and R.b = S.b Product of table cardinalities: $|R| * |S|$ Pair-wise join selectivity: $\dfrac{1}{|R|}$ Product of single table selectivities: $\dfrac{1}{|R|} * 1$ Estimated pair-wise join cardinality: $JC(R,S) = |R| * |S| * \dfrac{1}{|R|} * \dfrac{1}{|R|} * 1 = \dfrac{|S|}{|R|}$ Estimated pair-wise join selectivity: $js(R,S) = JC(R,S) / (|R| * |S|) = 1 / (|R| * |R|)$ If table cardinality of R is, for example, 400, then estimated pair-wise join cardinality is |S| / 400 and the estimated pair-wise join selectivity is 1/160,000.

However, if 75% of the records in joined table have "US" under attribute "a", then, given the example query, the actual pair-wise join cardinality is 0.75 * |S| and the actual pair-wise join selectivity is 0.75.

FIG. 4

(Conventional)

Estimate of Pair-wise Join Selectivity without
Assumption of Independence between Selection
and Join Predicates of the Same Table R' = resultant table *after the selection predicate has been applied to table R.*

From example, |R'| = 1

S' = resultant table *after the selection predicate has been applied to table S.*

From example, |S'| = |S|

Compute pair-wise join cardinality: JC' (R',S') = size (cardinality) of resultant table *after joining R' and S'.*

From example, JC' (R',S') = 0.75 * |S|

Estimate of pair-wise join selectivity: js' (R',S') = JC' (R',S') / (|R'|*|S'|)

From example, js'(R',S') = 0.75 * |S| / (1*|S|) = 0.75

Numerical Example
(taken from an actual database)

- select * from ctry R, perf S, dt_mth T
  where S.ctry_ky = R.ctry_ky and S.mth_key =T.mth_key
  and R.ctry_name = 'US' and T.fisc_yr_qtr = '2008Q4'  $R \rightarrow S \rightarrow T$
- $|R|$ = 296, $|S|$ = 1.65 million, $|T|$ = 132
- $|R'|$ = 1, $|S'|$ = 1.65 million, $|T'|$ = 3

- Table selectivities: r = 1/296, s = 1, t = 3/132
- js(R,S) = $|R$ join $S|/(|R| * |S|)$ = 1/296
- js(S,T) = $|S$ join $T|/(|S| * |T|)$ = 1/132
- js'(R',S') = $|R'$ join $S'|/(|R'| * |S'|)$ = 1.23 mil/1.65 mil = 0.75
- js'(S',T') = $|S'$ join $T'|/(|S'| * |T'|)$ =

149183/(1.65 million * 3) = 0.03

- Cardinality of query (conventional computation)
  = $|R|*|S|*|T| * r * s * t *$ js (R,S) * js (S,T)
  = $(|R|*r)*(|S|*s)*(|T|*t) *$ js (R,S) * js (S,T)
  = $|R'|*|S'|*|T'| *$ js (R,S) * js (S,T)      – (Equation 1)
  = 127
- Cardinality of query (improved computation)
  = $|R'|*|S'|*|T'| *$ js'(R',S')* js'(S',T')     -- (Equation 2)
  = 1 * 1.65 million * 3 * 0.75 * 0.03 = 113,375
- Actual cardinality = 109,356

FIG. 7

QUERY OPTIMIZER WITH JOIN CARDINALITY ESTIMATION WHICH MITIGATES THE EFFECTS OF SKEW

BACKGROUND

1. Field of the Invention

The present application relates generally to computer systems and software. More particularly, the present application relates to query optimization for computer database systems and software.

2. Description of the Background Art

Structured Query Language (SQL) is a popular standard for querying relational database management systems (DBMS). In SQL, a user or program generates a query that specifies the data to be retrieved.

A query optimizer has the purpose of determining an optimal or near optimal plan for executing an SQL query by modeling the execution cost for each of many alternate plans. The modeling generally uses aggregate statistics about the database tables, columns and indices. The plan with the lowest estimated cost may then be chosen as the one to be used for the actual execution of the query.

DETAILED DESCRIPTION

As discussed above, query optimizers are generally used to determine an optimal or near optimal query execution plan for a given SQL query to retrieve desired data from a relational database. Given an SQL query, there may be many different ways to access and process the data from the database tables to retrieve the specified data.

For example, there may be various ways to access each table referenced and to join these tables (including various ways to order the join operations). A join operation matches records in one table with records in another table based a specified condition. The result of a join operation is a resultant table that includes data from the tables being joined, where the data in the resultant table satisfies the specified condition.

In determining a query execution plan, a query optimizer may utilize a cardinality estimator to estimate a number of qualifying rows after various operations are applied. A query execution plan based on inaccurate cardinality estimates may perform orders of magnitude slower than one based on accurate cardinality estimates.

The present application relates to a problem with conventional cardinality estimators in situations where data is not evenly distributed in a database table. In other words, the present application relates to dealing with the problem of data skew by cardinality estimators.

Data skew is present when a relatively small number of distinct values represent a large number of records in a table. For example, a column of last names for customers may have a relatively large number of records where the last name is "Smith" or "Wong", and a relatively small number of records for unusual last names. Such a table has data skew. In another example, a column of nations for suppliers may have a relatively large number of suppliers from the "US" or "China", and a relatively small number of suppliers from other nations. Such a table would also have data skew.

In accordance with an embodiment of the invention, the computer-implemented methods described herein may be implemented using processor-executable instructions for a relational database management system (DBMS). These processor-executable instructions may be stored on a computer-readable medium or stored in computer-readable memory. These processor-executable instructions may be executed on a computer apparatus, such as depicted in FIG. 1A, for example.

Figure 1A:
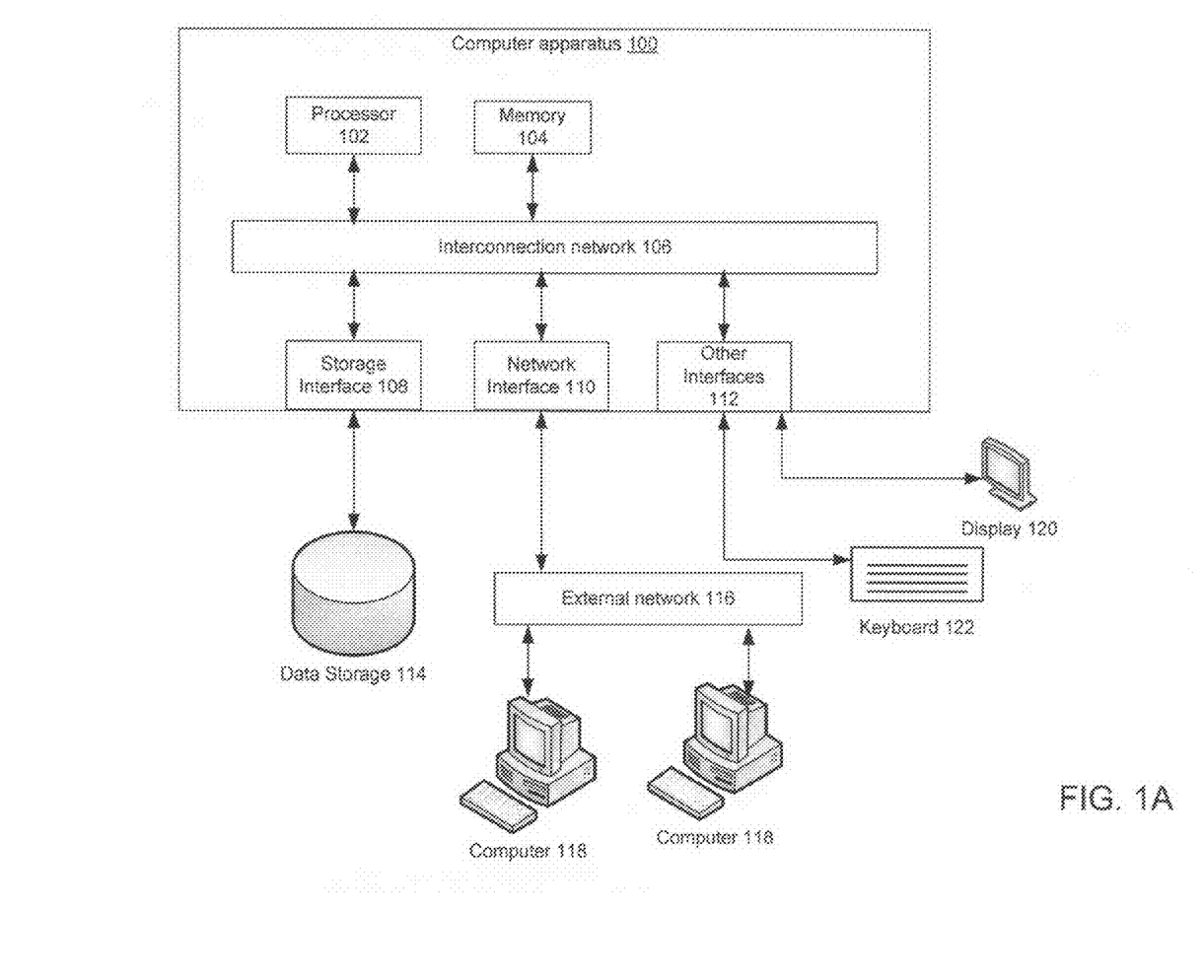
FIG. 1A is a schematic diagram depicting an example computer apparatus which may be configured to perform the methods in accordance with an embodiment of the invention.

FIG. 1A is a schematic diagram depicting an example computer apparatus 100 which may be configured to perform the methods in accordance with an embodiment of the invention. Other designs for the computer apparatus may be used in alternate embodiments.

As shown in FIG. 1A, the computer apparatus 100 comprises a processor 102, a computer-readable memory system 104, a storage interface 108, a network interface 110, and other interfaces 112. These system components are interconnected through the use of an interconnection network (such as a system bus or other interconnection system) 106. The storage interface 108 may be used to connect storage devices 114 to the computer apparatus 100. The network interface 110 may be used to communicate with other computers 118 by way of an external network 116. The other interfaces may interface to various devices, for example, a display 120, a keyboard 122, and other devices.

Figure 1B:
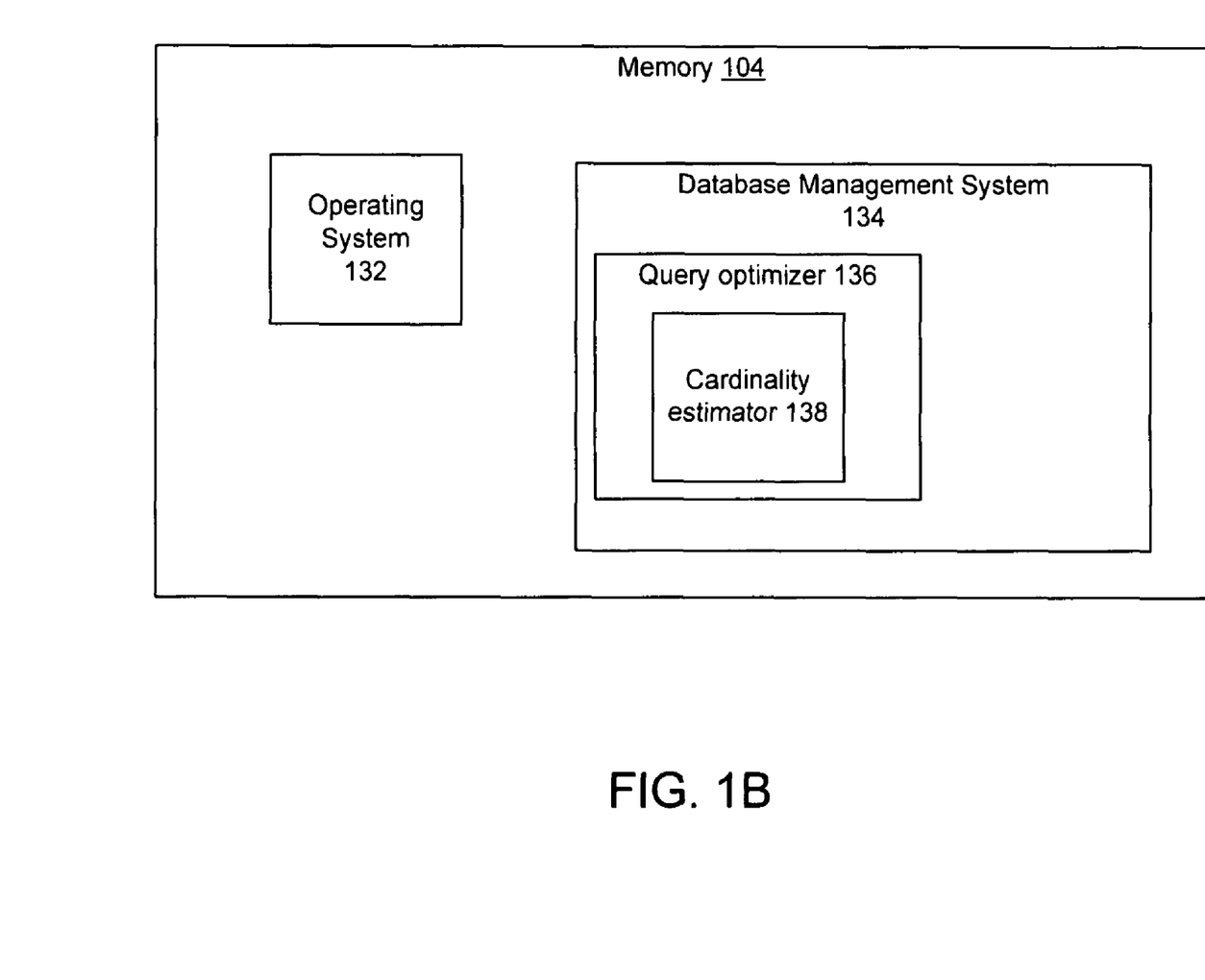
FIG. 1B is a schematic diagram showing select components in memory in accordance with an embodiment of the invention.

FIG. 1B is a schematic diagram showing select components in memory 104 in accordance with an embodiment of the invention. Memory 104 may be configured to include, in addition to other components and data, an operating system 132 and a database management system (DBMS) 134. Of relevance to the present application, the DBMS 134 may include a query optimizer 136, among other components. Furthermore, the query optimizer 136 may include a cardinality estimator 138, among other components.

Figure 2:
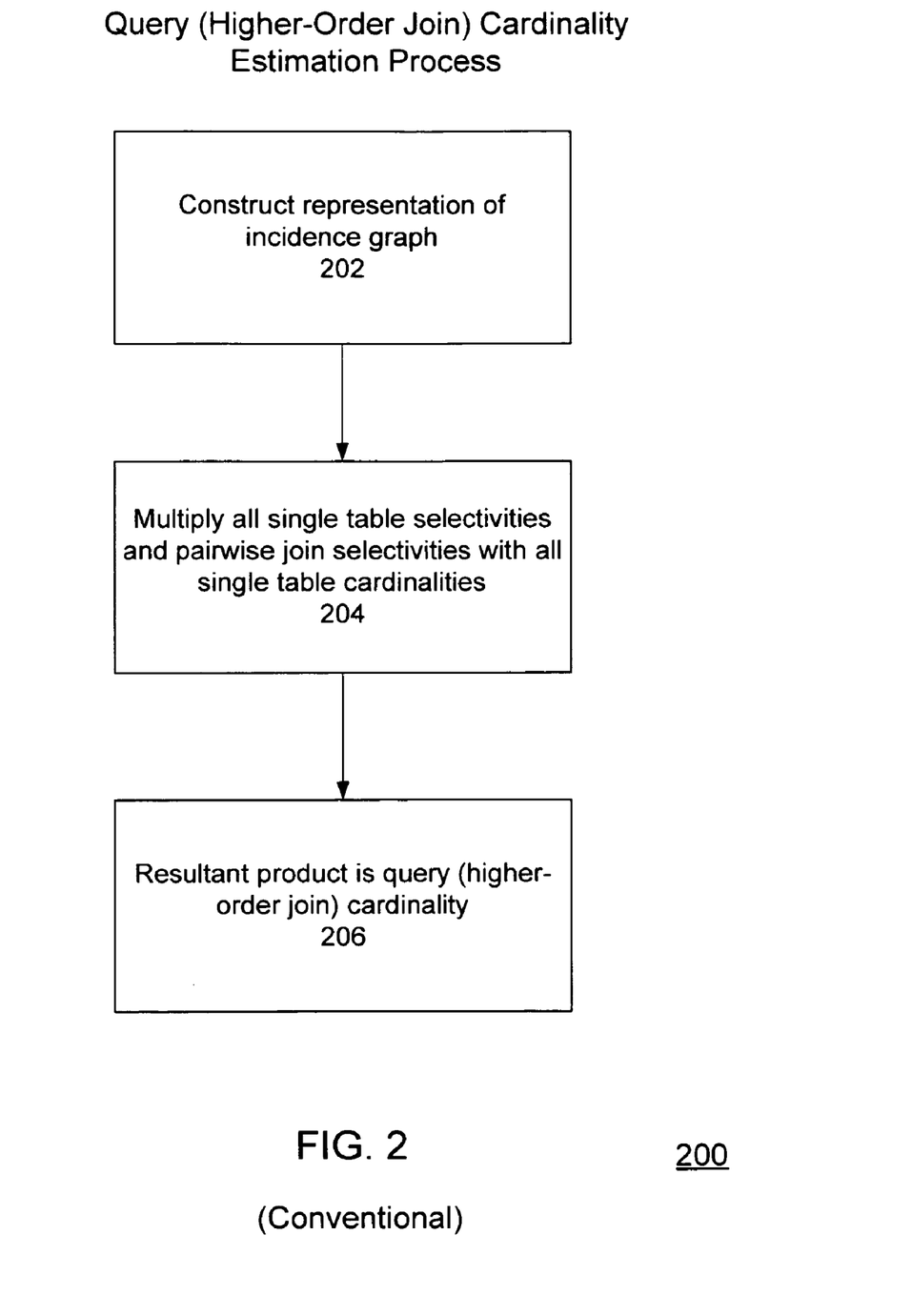
FIG. 2 is a flow chart depicting steps in a conventional process for estimating a query (higher-order join) cardinality.

FIG. 2 is a flow chart depicting steps in a conventional process 200 for estimating a query (higher-order join) cardinality. First, a representation of an incidence graph for the query is constructed 202. An incidence graph shows various tables in a database as nodes in the graph. Arrows between nodes represent pair-wise join operations. An example incidence graph is discussed below in relation to FIG. 3.

Next, a computational procedure 204 takes place in which the following are multiplied together: all single table selectivities, all pair-wise join selectivities, and all single table cardinalities. This computational procedure 204 is discussed further below in relation to the example shown in FIG. 3. The resultant product 206 of the computational procedure 204 is an estimate of the query cardinality.

Figure 3:
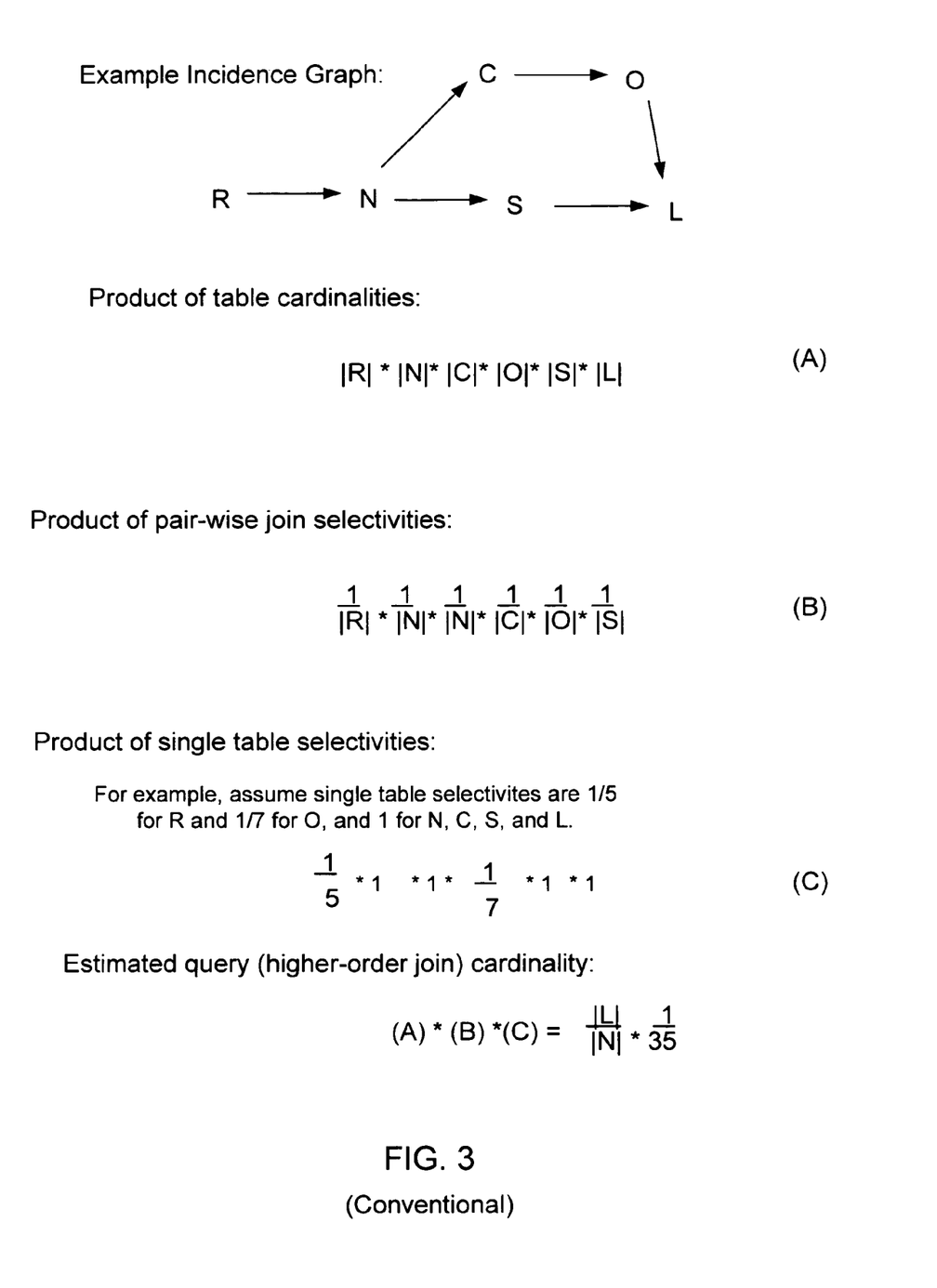
FIG. 3 depicts an example application of the conventional process for estimating a query (higher-order join) cardinality.

FIG. 3 depicts an example application of the conventional process for estimating a query cardinality (which is a higher-order join cardinality). This example uses a standard relational database designated query Q5 of TPCH.

First, let us give some definitions. A cardinality of table R is defined as |R|=the total number of rows in table R. A table selectivity for table R given a selection predicate is defined as s(R, predicate)=the rows in R satisfying the predicate/|R|. A join cardinality of tables R and S given a join predicate is defined as jc(R, S, join predicate)=the number of rows in the joined table. A join selectivity for tables R and S given a join predicate is defined as js(R, S, join predicate)=jc(R, S, join predicate)/(|R|*|S|), where * denotes multiplication.

Referring back to FIG. 3, at the top of FIG. 3 is shown an example incidence graph for a query. The incidence graph for the query includes the following six tables (nodes): R, N, C, O, S and L. There are six pair-wise joins shown in the incidence graph: R→N, N→C, N→S, C→O, O→L, and S→L, where the arrows represent pair-wise join operations from a "primary" table to a "foreign" table.

Next, the product of all single table cardinalities for tables present in the query is shown. The single table cardinality for table R is denoted as |R|, the single table cardinality for table N is denoted as |N|, and similarly for the other tables. Hence, in this example, the product of all single table cardinalities, denoted (A) in FIG. 3, is |R|*|N|*|C|*|O|*|S|*|L|, where as used herein * denotes a multiplication operation.

Next, the product of all pair-wise join selectivities for joins present in the query is shown. In this example, all joins are primary key—foreign key joins (each arrow pointing from the primary table to the foreign table in the incidence graph). Hence, the join selectivity of the edge X→Y is 1/|X|. In this example, the product of all pair-wise join selectivities, denoted (B) in FIG. 3, is (1/|R|)*(1/|N|)*(1/|N|)*(1/|C|)*(1/|O|)*(1/|S|).

Next, the product of all single table selectivities for tables present in the query is shown. The single table selectivity for table X represents the fraction of records selected from table X due to the application of a query predicate. In this example, a query predicate is assumed such that the single table selectivities are ⅕ for table R, ⅐ for table O, and 1 for tables N, C, S, and L. Thus, the product of all single table selectivities, denoted (C) in FIG. 3, is (⅕)*1*1*(⅐)*1*1=1/35.

Finally, the conventional estimate for the query cardinality (which is a higher-order join cardinality) is given. As described above per block 204 of FIG. 2, the conventional estimate for the query cardinality is the product of all single table cardinalities (A), all pair-wise join selectivities (B), and all single table selectivities (C). In this example, the query cardinality is estimated to be (|L|/|N|)*(1/35).

The above-discussed computational procedure 204 to estimate the query cardinality assumes that all the predicates in an SQL query are independent. The predicate selectivities obtained, typically using histograms, are then multiplied with the table cardinalities to give the optimizer an estimate of the cardinality of the query. The predicate selectivities are multiplied because of the independence assumption.

When the independence assumption (that all the predicates in an SQL query are independent) is not true (i.e. when it is inaccurate), the above-discussed computation can lead to large errors in the estimation of the query cardinality. Poor estimation of the query cardinality can, in turn, lead to very poor plan selection by the optimizer.

Applicant has found that a large contributor to query cardinality estimation error in the presence of data skew is due to the more specific assumption that a selection predicate of a table and its corresponding join predicate are independent. In particular, applicant has determined that this assumption often causes large errors in estimating pair-wise join selectivity when there is data skew.

Figure 4:
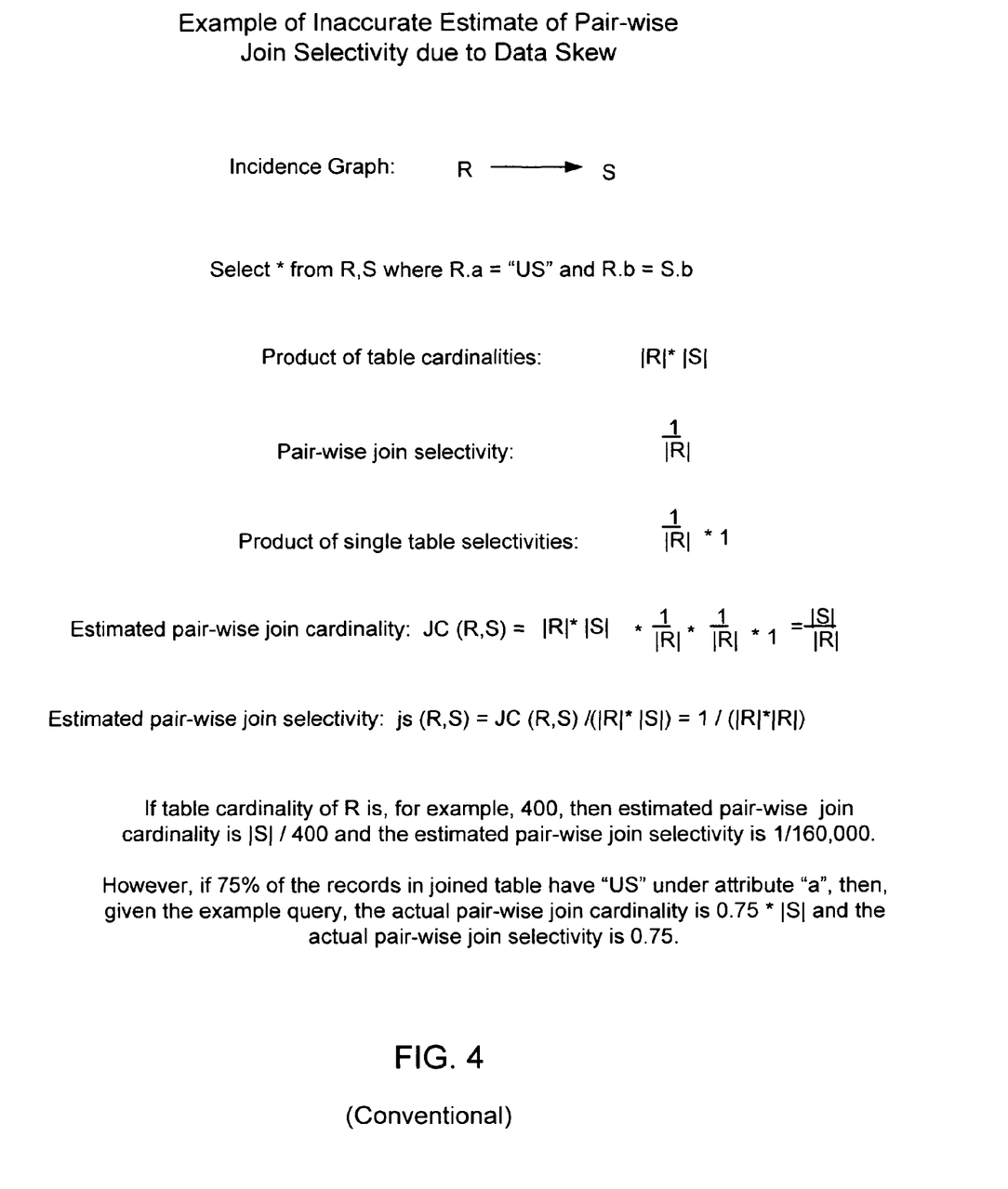
FIG. 4 depicts an example of an inaccurate estimate of pair-wise join selectivity due to data skew.

FIG. 4 depicts an example of an inaccurate estimate of pair-wise join selectivity due to data skew. At the top of FIG. 4 is shown a simple incidence graph R→S.

Next, a query is shown. In particular, the query requests the selection of all records from the joined tables R and S, where R.a="US" (attribute a in table R is "US"), and where the condition of the join is R.b=S.b (attribute b in table R matches attribute b in table S).

Next, the product of the two single table cardinalities is shown. The single table cardinality for table R is denoted as |R|, and the single table cardinality for table S is denoted as |S|. Hence, in this example, the product of the two single table cardinalities is |R|*|S|.

Next, the pair-wise join selectivity is shown. In this example, the join is a primary key—foreign key join (the arrow pointing from the primary table to the foreign table in the incidence graph). Hence, the join selectivity of the edge R→S is 1/|R|.

Next, the product of the two single table selectivities is shown. The single table selectivity for table X represents the fraction of records selected from table X due to the application of a query predicate. In this case, assuming that R.a="US" is a unique entry in table R, the single table selectivity for table R is 1/|R|, while the single table selectivity for table S is 1.

Next, the estimated pair-wise join cardinality JC(R,S) is given in accordance with the conventional computation 204. As discussed above, the conventional estimate for the join cardinality is the product of single table cardinalities, pair-wise join selectivities, and single table selectivities. In this case, the pair-wise join cardinality JC(R,S) is estimated to be |S|/|R|.

Next, the estimated pair-wise join selectivity js(R,S) is shown. Using the formula js(R,S)=JC(R,S)/(|R|*|S|), it is determined that the pair-wise join selectivity js(R,S)=1/(|R|*|R|).

Consider the example where the table cardinality of R is 400. In that case the estimated pair-wise join cardinality JC(R,S) is |S|/400, and the estimated pair-wise join selectivity js(R,S) is 1/160,000.

However, if 75% of the records in the joined table have "US" under attribute a, then, given the sample query, the actual pair-wise join cardinality is 0.75*|S|, and the actual pair-wise join selectivity is 0.75. Thus, with a large amount of data skew, the estimates for the pair-wise join cardinality and the pair-wise join selectivity may become orders of magnitude in error.

To correct or mitigate such large errors in the presence of data skew, applicant has determined a computational procedure that does not rely on the assumption that a selection predicate of a table and its corresponding join predicate are independent. This improved computational procedure is discussed below in relation to FIGS. 5-7.

Figure 5:
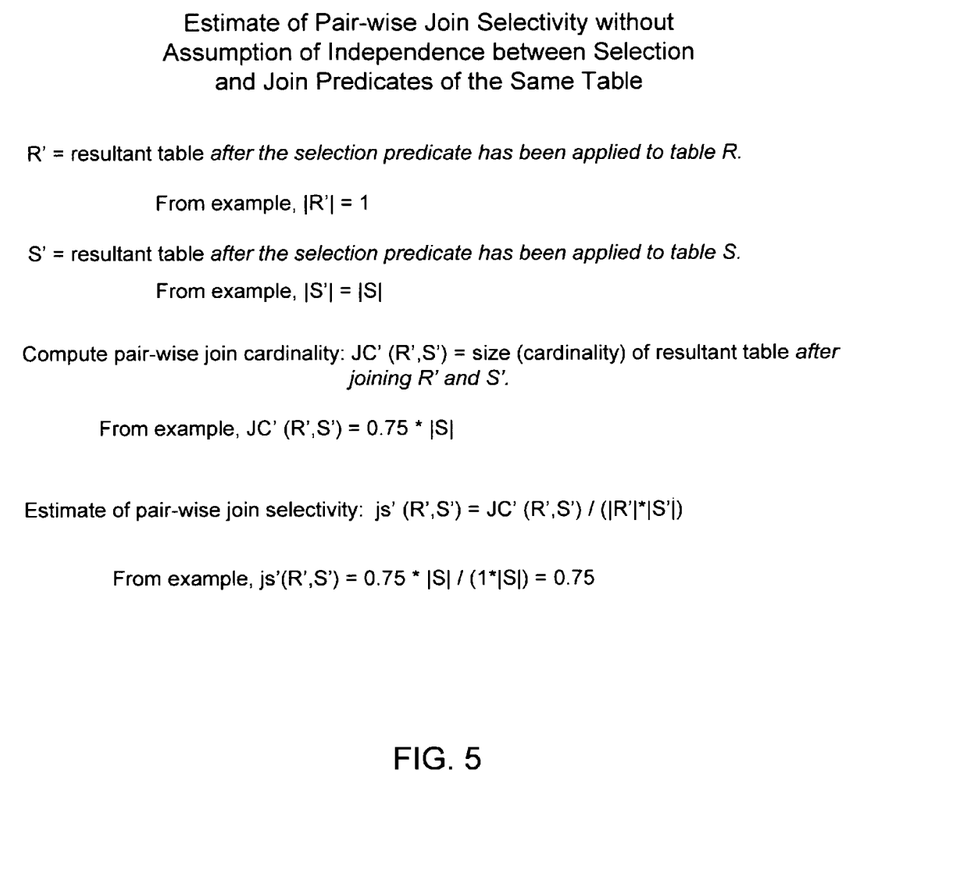
FIG. 5 depicts a procedure for estimating pair-wise join selectivity which does not rely on the assumption that a selection predicate of a table and its corresponding join predicate are independent.

FIG. 5 depicts a procedure for estimating pair-wise join selectivity which does not rely on the assumption that a selection predicate of a table and its corresponding join predicate are independent. As described below, this procedure largely corrects or mitigates error due to skew in the joining columns.

At the top of FIG. 5 is shown a definition of R' as the resultant table after the selection predicate has been applied to table R, and a definition of S' as the resultant table after the selection predicate has been applied to table S. From the above example discussed in relation to FIG. 4, the cardinality of R' may be equal to one (i.e. |R'|=1), and the cardinality of S' may be equal to the cardinality of S (i.e. |S'|=|S|).

Next is shown a definition for the pair-wise join cardinality JC'(R',S') as the size (cardinality) of the resultant table after joining R' and S'. From the above example discussed in relation to FIG. 4, JC'(R',S')=0.75*|S|. Such pair-wise join cardinalities may be computed using various techniques. For example, the "end-biased samples" technique of Estan et al. may be employed. See "End-biased Samples for Join Cardinality Estimation," Cristian Estan, Jeffrey F. Naughton, $22^{nd}$ International Conference on Data Engineering (ICDE '06), April 2006. Other known techniques may be used to compute the pair-wise joint cardinalities. In this example, the computed pair-wise join cardinality matches the actual pair-wise join cardinality. In practice, the computed pair-wise join cardinality is expected to be a reasonable approximation of the actual pair-wise join cardinality, even in the presence of data skew.

Finally, an improved estimate of the pair-wise join selectivity js'(R',S') is obtained by dividing the computed pair-wise join cardinality JC'(R',S') by the product of the single table cardinalities after the selection predicate has been applied (i.e. |R'|*|S'|). From the above example discussed in relation to FIG. 4, js'(R',S')=0.75*|S|/(1*|S|)=0.75. In this example, the improved estimate of the pair-wise join selectivity matches the actual pair-wise join selectivity. In practice, the improved estimate of the pair-wise join selectivity is expected to be a reasonable approximation of the actual pair-wise join selectivity, even in the presence of data skew.

Figure 6:
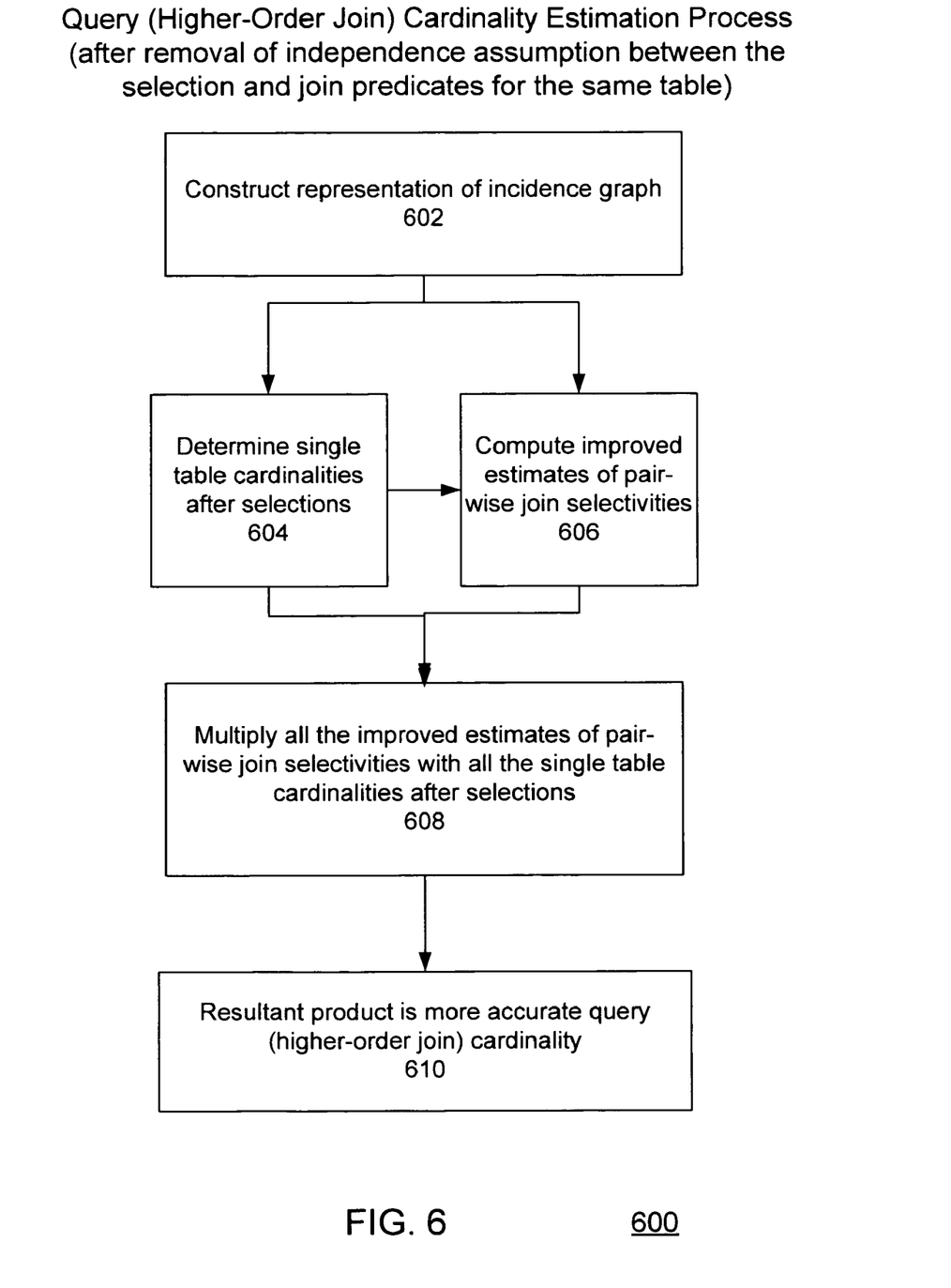
FIG. 6 is a flow chart depicting steps in an improved process for estimating a query (higher-order join) cardinality.

FIG. 6 is a flow chart depicting steps in an improved process 600 for estimating a query cardinality (which is a higher-order join cardinality). This process 600 uses the more accurate pair-wise join selectivities determined per FIG. 5. In this process 600, although independence is no longer being assumed between the selection and join predicates of the same table, independence is continued to be assumed between the join predicates. Due to the assumed independence among the join predicates, we can multiply the more accurate pair-wise join selectivities computed per FIG. 5 with the cardinalities of the tables present in the query to estimate the query cardinality.

First, a representation of an incidence graph for the query is constructed 602. As previously discussed, an incidence graph shows various tables in a database as nodes in the graph, and arrows (edges) between nodes represent pair-wise join operations.

Next, single table cardinalities after selections (i.e. single table cardinalities after application of the selection predicates) are determined 604. These single table cardinalities after selections correspond to the |R'| for table R and the |S'| for table S, as described above in relation to FIG. 5.

Next, the improved estimates of pair-wise join selectivities are computed 606. These improved estimates of pair-wise join selectivities correspond to the js'(R',S') for tables R' and S', as described above in relation to FIG. 5.

Next, a computational procedure 608 takes place in which the following are multiplied together: all the improved estimates of pair-wise join selectivities and all the single table cardinalities after selections. The resultant product 610 of the computational procedure 608 is an improved estimate of the query cardinality. This improved estimate of the query cardinality is a reasonable approximation of the query cardinality, even in the presence of data skew.

Figure 7:
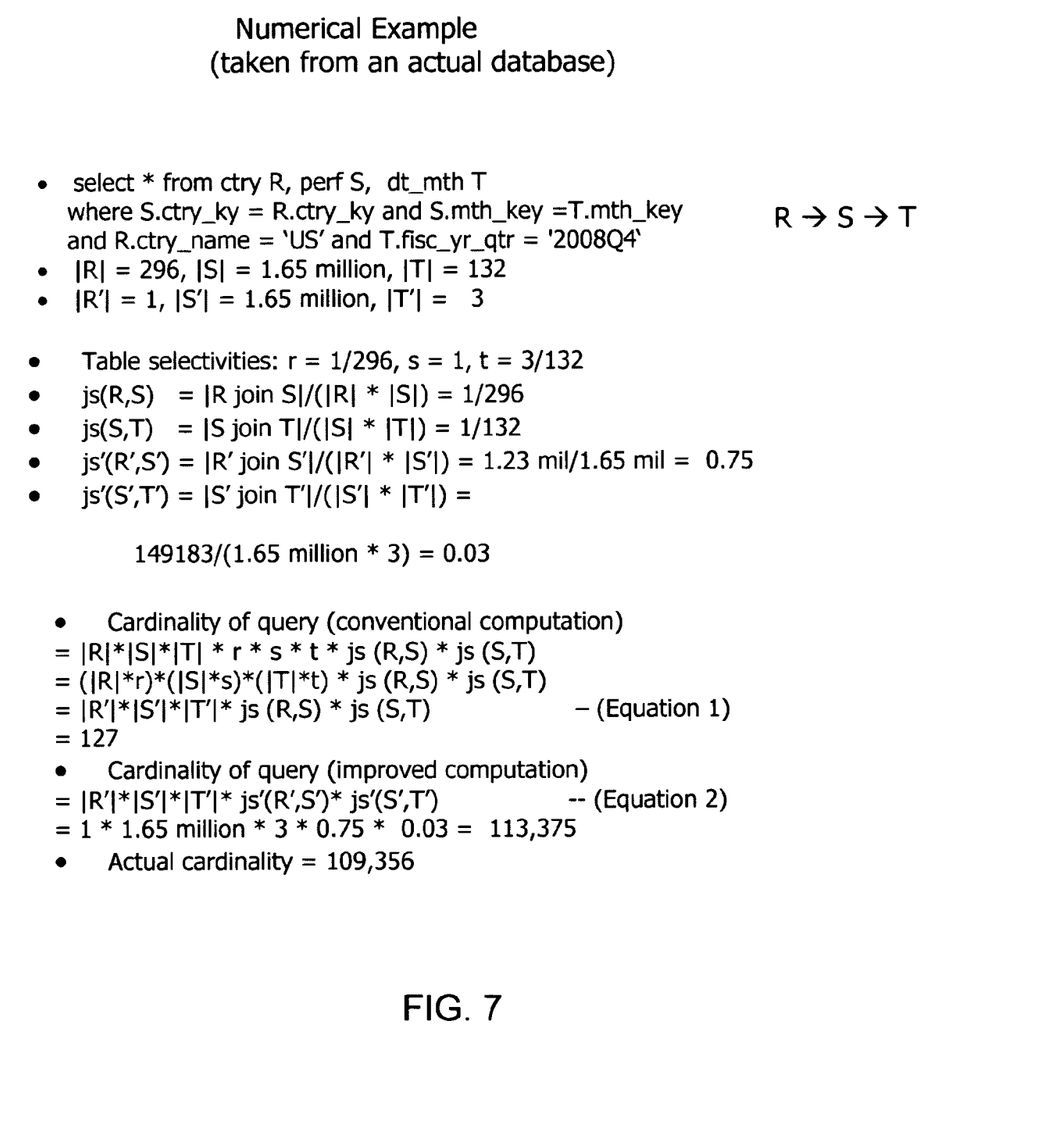
FIG. 7 depicts an example of numerical results obtained using an actual commercial database.

FIG. 7 depicts an example of numerical results obtained using an actual commercial database. At the top of FIG. 7, an example query on an example database is shown. The example query is shown as: select * from ctry R, perf S, dt_mth T, where S.ctry_ky=R.ctry_ky, and S.mth_key=T.mth_key, and R.ctry_name='US' and T.fisc_yr_qtr='2008Q4'. In other words, the query is for all records from the joined tables R, S, T, where R.ctry_name='US' and T.fisc_yr_qtr='2008Q4', and where the condition of the join is S.ctry_ky=R.ctry_ky, and S.mth_key=T.mth_key. As shown, the incidence graph for this query is R→S→T.

In this example, the cardinality of table R is 296 (i.e. |R|=296), the cardinality of table S is 1.6 million (i.e. |S|=1.6 million), and the cardinality of table T is 132 (i.e. |T|=132). Moreover, in accordance with block 604 of FIG. 6, the single table cardinalities after the selection predicate has been applied are shown. These single table cardinalities after selection, in this example, are |R'|=1, |S'|=1.65 million, and |T'|=3.

The table selectivities, in this example, are as follows. The table selectivity for table R is r=1/296, for table S is s=1, and for table T is t=3/132. The pair-wise join selectivities as conventionally estimated are shown as: js(R,S)=|R join S|/(|R|*|S|)=1/296 ; and js(S,T)=|S join T|/(|S|*|T|)=1/132. The pair-wise join selectivities as computed per block 606 of FIG. 6 are shown as: js'(R',S')=|R' join S'|/(|R'|*|S'|)=1.23 million/1.65 million=0.75; and js'(S',T')=|S' join T'|/(|S'|*|T'|)=149,183/(1.65 million*3)=0.03.

A comparison is then made as to the query cardinality calculated per the conventional computation (Equation 1) versus the query cardinality calculated per the improved computation disclosed herein (Equation 2).

Per block 204 of FIG. 2, the conventional computation (Equation 1) calculates the query cardinality as: |R|*|S|*|T|*r*s*t*js(R,S)*js(S,T)=(|R|*r)*(|S|*s)*(|T|*t)*js(R,S)*js(S,T)=|R'|*|S'|*|T'|*js(R,S)*js(S,T). In this case, |R'|*|S'|*|T'|*js(R,S)*js(S,T)=1*1,650,000*3*(1/296)*(1/132)= 127 is the estimated query cardinality.

In comparison, per block 606 of FIG. 6, the improved computation (Equation 2) calculates the query cardinality as: |R'|*|S'|*|T'|*js'(R',S')*js'(S',T'). In this case, |R'|*|S'|*|T'|*js'(R',S')*js'(S',T')=1*1,650,000*3*0.75*0.03=113,375 is the estimated query cardinality.

The actual query cardinality in this numerical example turns out to be 109,356. Clearly, the estimated query cardinality of 113,375 per Equation 2 is much closer to the actual cardinality than the estimated query cardinality of 127 per Equation 1. Thus, it is shown by this numerical example how the improved computation per Equation 2 gives a reasonable approximation of the query cardinality, even in the presence of substantial data skew.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined by the following claims, which are to be construed in accordance with established doctrines of claim interpretation.

What is claimed is:

1. A computer-implemented method to estimate a cardinality of a database query, the method comprising:
   determining single table cardinalities after application of selection predicates;
   estimating pair-wise join selectivities without assuming independence between selection and join predicates by dividing a pair-wise join cardinality by a product of the single table cardinalities; and
   multiplying said pair-wise join selectivities with said single table cardinalities after application of the selection predicates.

2. The method of claim 1, wherein the database query comprises the selection predicates and join conditions.

3. The method of claim 1, further comprising:
   generating a representation of an incidence graph for the query.

4. The method of claim 3, wherein the incidence graph comprises nodes representing tables and arrows representing pair-wise join operations.

5. The method of claim 1, wherein estimating the pair-wise join selectivities includes determining resultant tables after application of the selection predicates, and computing the pair-wise join cardinality comprising a size of a further resultant table after joining two said resultant tables.

6. A computer apparatus comprising:
   a processor configured to execute computer-readable instructions;
   memory configured to store the computer-readable instructions and other data;
   a network interface configured to receive a database query;
   an interconnection network for communications between said processor, said memory, and said network interface;
   a query optimizer in said memory; and
   a cardinality estimator in said memory, wherein said cardinality estimator includes computer-readable instructions configured to (a) determine single table cardinalities after application of selection predicates from the database query, (b) estimate pair-wise join selectivities without assuming independence between the selection predicates and join predicates of the database query by dividing a pair-wise join cardinality by a product of the single table cardinalities, and (c) multiply said pair-wise join selectivities with said single table cardinalities after application of the selection predicates.

7. The apparatus of claim 6, further comprising:
   computer-readable instructions in said memory which are configured to generate a representation of an incidence graph for the query.

8. The apparatus of claim 7, wherein the incidence graph comprises nodes representing tables and arrows representing pair-wise join operations.

9. The apparatus of claim 6, wherein the computer-readable instructions configured to estimate the pair-wise join selectivities includes computer-readable instructions configured to determine resultant tables after application of the selection predicates and to compute a pair-wise join cardinality comprising a size of a further resultant table after joining two said resultant tables.

10. A non-transitory, computer-readable medium for storing computer-readable code, the medium comprising:
    computer-readable code configured to determine single table cardinalities after application of selection predicates from a database query;
    computer-readable code configured to estimate pair-wise join selectivities without assuming independence between the selection predicates and join predicates of the database query by dividing a pair-wise join cardinality by a product of the single table cardinalities; and
    computer-readable code configured to multiply said pair-wise join selectivities with said single table cardinalities after application of the selection predicates.

* * * * *